(No Model.)
P. H. YAUMAN.
FISHING REEL.
No. 378,565. Patented Feb. 28, 1888.
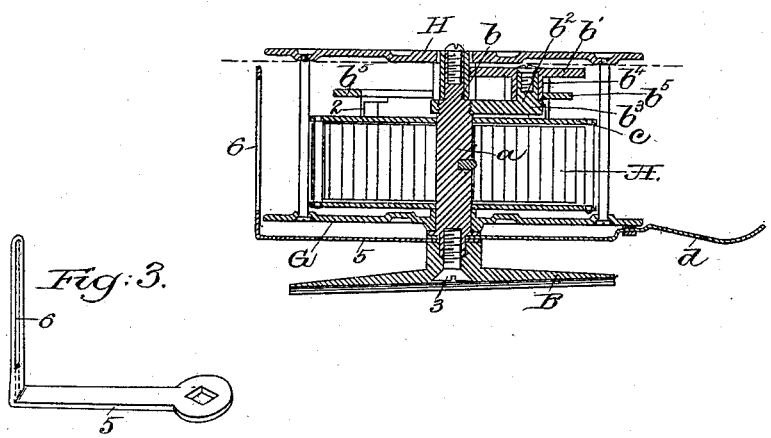
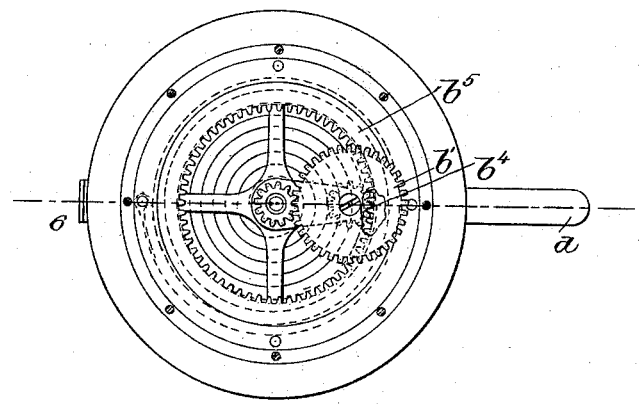
Witnesses.
Fred S. Greenleaf
Howard F. Eaton
Inventor.
Phillip H. Yauman
by Crosby Gregory attys

UNITED STATES PATENT OFFICE.

PHILLIP H. YAUMAN, OF ROCHESTER, NEW YORK.

FISHING-REEL.

SPECIFICATION forming part of Letters Patent No. 378,565, dated February 28, 1888.

Application filed October 25, 1887. Serial No. 253,302. (No model.)

*To all whom it may concern:*

Be it known that I, PHILLIP H. YAUMAN, of Rochester, county of Monroe, and State of New York, have invented an Improvement in Fishing-Reels, of which the following description, in connection with the accompanying drawings, is a specification, like letters on the drawings representing like parts.

This invention is an improvement upon the fishing-reel shown and described in United States Patent, No. 235,157, granted to F. A. Loomis, December 7, 1880, and has for its object to make a much more effective and durable reel. The multiplying and planetary gearing employed in the reel shown in said patent is in practice liable to get out of order, the toothed wheels thereof springing or being forced out of mesh by the action of the mainspring.

In accordance with this invention, in lieu of the gearing therein shown, the pinion fixed to the spool upon which the line is wound engages a toothed wheel having its bearings in a short arm fixed to a shaft upon which the spool revolves loosely, the hub of said toothed wheel being provided with teeth to form a pinion which meshes with an internally-toothed wheel fixed to the frame containing the spring, so that as the spool is revolved in one direction the spring will be wound up, and when the spool is released from the control of a suitable brake, the spring recoiling effects the rotation of the said spool in the opposite direction. By this form of gearing excess of pressure between some of the gears which would tend to force them apart is made to force other of the gears closer together, thereby overcoming all tendency of the gears to slip.

Figure 1 shows in vertical section a fisherman's reel embodying this invention; Fig. 2, a plan view of the reel, one of the disks of the line-spool being removed; and Fig. 3, a detail of the line-guide to be described.

The skeleton spool, composed of the two disks or heads G H, connected by rods or bars, is mounted loosely upon a shaft, $a$. A pinion, $b$, is fixed to one of the disks or heads, as H, the teeth of which engage a toothed wheel, $b'$, mounted loosely upon a stud, $b^2$, projecting from an arm, $b^3$, fixed to the shaft $a$, the hub of the toothed wheel $b'$ being provided with teeth to form a pinion, $b^4$, which engages the teeth of an internally-toothed wheel, $b^5$, fixed, by means of a standard, 2, to the frame or case $c$ containing the mainspring A. One end of the spring A is attached to the shaft $a$ and the other end to its frame or case. As the line is drawn from the spool G H, the pinion $b$ rotates the wheel $b'$, and its hub in turn rotates the internally-toothed gear $b^5$, which, being fixed to the frame or case $c$ containing the spring A, winds up the said spring. A friction brake-lever, $d$, is attached to the shaft $a$, which, bearing against the exterior of one of the disks or heads, as G, keeps the spool in whatever position it may be left. A line-guide is also attached to the shaft $a$, said line-guide consisting of a flat plate having a bent wire riveted to one end thereof, the joint being finished with solder, such form of line-guides being shown in Fig. 3. The curved plate B, by which the reel is attached to the pole, is secured to the shaft $a$ by a screw, 3, the said screw and plate serving also as a means for holding the brake-lever and line-guide in position. By the employment of the internally-toothed gear and its operating-gears, as described, any tendency of the spring to exert a force to throw the gears outward from each other will operate to better engage the gears one with another, thereby greatly increasing the durability of the reel, and by making the line-guide loop of wire a much smoother surface is presented, over which the line travels with less friction and danger of fraying or cutting, as often occurs with guides struck up from sheet metal. The flat portion of the guide gives it much greater rigidity when subjected to a sudden strain, by reason of knots or kinks in the line, than when the whole guide is constructed of wire.

I am aware that a guide has been struck up from a single piece of sheet metal; and I am also aware that a guide has been made entirely of wire, both of which constructions I disclaim.

I claim—

1. In a fishing-reel, the line-spool, its shaft, the mainspring, and its independently-revolving frame or case, combined with the pinion $b$, toothed wheel $b'$, fixed pinion $b^4$, integral with the wheel $b'$, and internally-toothed wheel $b^5$, fixed to the spring frame or case and rotating therewith, substantially as described.

2. In a fishing-reel, the line-spool, combined with the line-guide attached to the shaft composed of the flat plate 5, and the independent wire loop 6, secured to its outer end at right angles thereto, substantially as described.

In testimony whereof I have signed my name to this specification in the presence of two subscribing witnesses.

PHIL. H. YAUMAN.

Witnesses:
MORITZ WIESNER, Jr.,
PAUL ERBE.